(12) United States Patent
Wang et al.

(10) Patent No.: US 10,512,317 B2
(45) Date of Patent: Dec. 24, 2019

(54) MOBILE DEVICE CONTAINING BAG

(71) Applicant: Dongguan Mangrove Sports Limited, Dongguan (CN)

(72) Inventors: Zhichao Wang, Dongguan (CN); Yiwen Zheng, Dongguan (CN)

(73) Assignee: DONGGUAN MANGROVE SPORTS LIMITED, Dongguan (CN)

( * ) Notice: Subject to any disclaimer, the term of this patent is extended or adjusted under 35 U.S.C. 154(b) by 13 days.

(21) Appl. No.: 15/889,380

(22) Filed: Feb. 6, 2018

(65) Prior Publication Data

US 2019/0059541 A1 Feb. 28, 2019

(30) Foreign Application Priority Data

Aug. 28, 2017 (CN) ..................... 2017 2 1083145 U

(51) Int. Cl.
| | |
|---|---|
| A45C 11/00 | (2006.01) |
| A45F 5/00 | (2006.01) |
| H04B 1/3827 | (2015.01) |
| H04M 1/02 | (2006.01) |

(52) U.S. Cl.
CPC ............ *A45C 11/00* (2013.01); *A45F 5/00* (2013.01); *H04B 1/385* (2013.01); *A45C 2011/002* (2013.01); *A45F 2005/008* (2013.01); *A45F 2200/0516* (2013.01); *H04M 1/0202* (2013.01)

(58) Field of Classification Search
CPC ............ A45C 11/00; A45F 5/00; H04B 1/385
USPC ....................................... 224/222
See application file for complete search history.

(56) References Cited

U.S. PATENT DOCUMENTS

| | | | | |
|---|---|---|---|---|
| 6,629,628 | B1 * | 10/2003 | Canepari ................. | A45C 1/04 150/112 |
| 2006/0011687 | A1 * | 1/2006 | Wadley .................... | A45F 3/00 224/587 |
| 2009/0020570 | A1 * | 1/2009 | Chan ........................ | A45F 5/00 224/222 |
| 2009/0057357 | A1 * | 3/2009 | Rohrbach ................ | A45F 5/00 224/222 |
| 2010/0032462 | A1 * | 2/2010 | Cameron ................ | A45C 11/00 224/222 |
| 2011/0031290 | A1 * | 2/2011 | Remo ....................... | A45F 5/00 224/222 |
| 2012/0152990 | A1 * | 6/2012 | Kulas ....................... | A45F 5/00 224/222 |
| 2015/0150359 | A1 * | 6/2015 | Lowry ..................... | A45F 5/00 224/222 |

(Continued)

FOREIGN PATENT DOCUMENTS

CN 203596848 U 5/2014

OTHER PUBLICATIONS

Chinese Office Action from CN Application No. 201721083145.8, dated Feb. 8, 2018.

*Primary Examiner* — Peter N Helvey
(74) *Attorney, Agent, or Firm* — Workman Nydegger

(57) ABSTRACT

Disclosed is a mobile device containing bag having a flat first baffle member and a flat second baffle member extending in parallel. A connector is configured to connect opposite edges of the first and the second baffle members together, so that a mobile device accommodation space is defined by the first baffle member, the second baffle member, and the connector. The mobile device containing bag can effectively prevent mobile device from vibrating or shaking in the mobile device accommodation space.

7 Claims, 3 Drawing Sheets

(56) References Cited

U.S. PATENT DOCUMENTS

2016/0106201 A1* 4/2016 Taylor .................. A45F 5/00
224/222

* cited by examiner

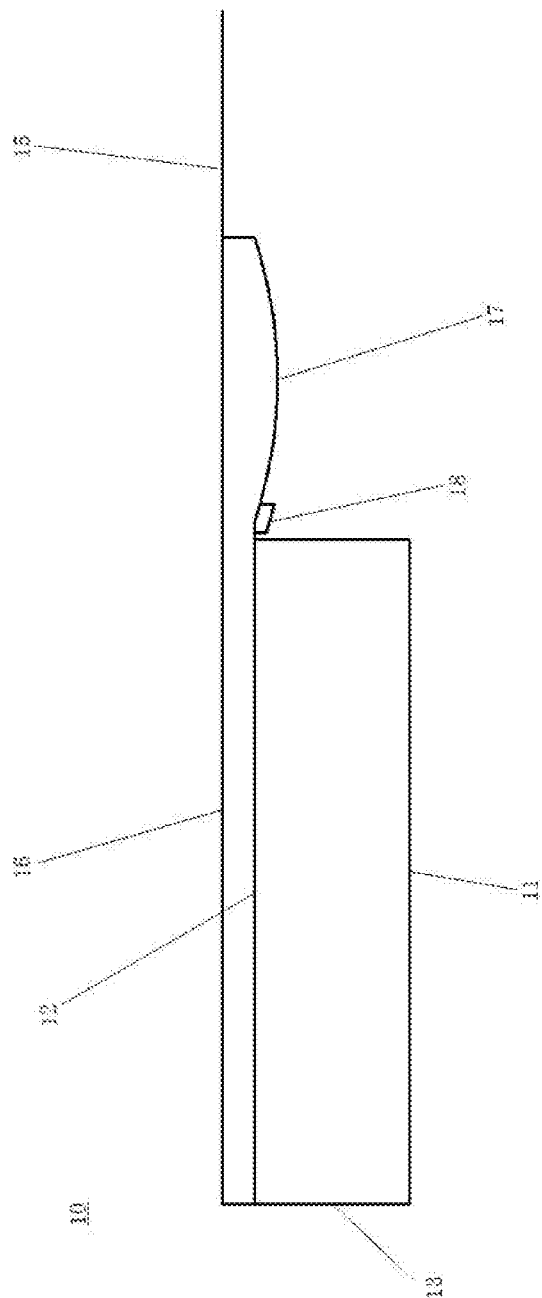

MOBILE DEVICE CONTAINING BAG

TECHNICAL FIELD

The present invention relates to the field of accommodation of articles, particularly to a mobile device containing bag.

TECHNICAL BACKGROUND

Mobile device, such as mobile phone, has been becoming one of indispensable means in human's daily life. However, it is still inconvenient for human to carry a mobile device when going out. For example, when going out for sports, a user will have to hold the mobile device by at least one hand. It is difficult for the user to carry the mobile device without hand(s).

In prior arts there is no accommodation means specially designed for carrying mobile device. Normally, human will select a universal accommodation means with a similar size to carry the mobile device. In this case, however, accessing and storing the mobile device are both inconvenient. For example, when human with the mobile device is doing sports, especially strenuous exercises, he or she will feel violent vibration or shake of the mobile device in the accommodation means, which will often cause strong uncomfortableness.

Therefore, there exists a need for an accommodation means used for carrying mobile device.

SUMMARY OF THE INVENTION

Aiming to the above problem, the present invention proposes a bag for containing a mobile device.

According to the present invention, a mobile device containing bag is proposed, comprising: a flat first baffle member; a flat second baffle member, which is arranged opposite to and spaced from the first baffle member, the second baffle member extending in parallel with the first baffle member; and a connector. The connector is configured to connect opposite edges of the first baffle member and the second baffle member together, so that a mobile device accommodation space is defined by the first baffle member, the second baffle member, and the connector.

When a mobile device is put in the mobile device accommodation space, it can be clamped between the flat first baffle member and the flat second baffle member. A suitable distance can be maintained between the first baffle member and the second baffle member through the connector, so that the mobile device can be safely held in the mobile device accommodation space without vibration or shake.

According to an embodiment, the first baffle member is configured as a frame, with a hollow-out portion in a central area thereof.

According to an embodiment, the frame includes two first side strips, which are opposite to each other but both extend along a first direction, and a second side strip, which extends along a second direction perpendicular to the first direction and connects said two first side strips with each other at opposite ends thereof.

According to an embodiment, the connector includes an elastic sheet extending between opposite edges of the first baffle member and the second baffle member, the first baffle member being connected with the second baffle member through the elastic sheet.

According to an embodiment, the connector includes: a protrusion, which extends from a front surface of the first baffle member along a direction far away from the second baffle member; and a catch, which is connected with the second baffle member, and configured to be movable over the protrusion to engage with an inner side face of the protrusion.

According to an embodiment, the catch is a flexible elongated element. Both ends of the flexible elongated element are connected with the second baffle member, and a middle portion thereof is configured to be moveable over the protrusion to engage with the inner side face of the protrusion.

According to an embodiment, the flexible elongated element is made of elastic material.

According to an embodiment, the mobile device containing bag further includes a first auxiliary containing sheet, which is arranged at a side of the second baffle member far away from the first baffle member. The first auxiliary containing sheet is connected with the second baffle member at an edge thereof, thus forming a first accommodation space between the first auxiliary containing sheet and the second baffle member.

According to an embodiment, the mobile device containing bag further includes a band connected with the second baffle member. A portion of the band extends beyond the second baffle member along an outward direction. A second auxiliary containing sheet is arranged in a region of said portion of the band, which is adjacent to the second baffle member and at a side of the band toward the first baffle member. The second auxiliary containing sheet is connected with the band at an edge thereof, thus forming a second accommodation space between the second auxiliary containing sheet and the band.

According to an embodiment, the mobile device containing bag further includes a band, which is arranged at a side of the second baffle member far away from the first baffle member. The band is connected with the second baffle member at an edge thereof, thus forming a first accommodation space between the band and the second baffle member. A portion of the band extends beyond the second baffle member along an outward direction. A second auxiliary containing sheet is arranged in a region of said portion of the band, which is adjacent to the second baffle member and at a side of the band toward the first baffle member. The second auxiliary containing sheet is connected with the band at an edge thereof, thus forming a second accommodation space between the second auxiliary containing sheet and the band. The first accommodation space shares a common opening with the second accommodation space.

Compared with the prior arts, the present invention can achieve the following advantages. When a mobile device is put in the mobile device accommodation space, it can be clamped between the flat first baffle member and the flat second baffle member. A suitable distance can be maintained between the first baffle member and the second baffle member through the connector, so that the mobile device can be safely held in the mobile device accommodation space without vibration or shake.

BRIEF DESCRIPTION OF THE DRAWINGS

In the following the present invention will be illustrated with the accompanying drawings, in which:

FIG. 4 schematically shows a top view of a mobile device containing bag according to a still further embodiment of the present invention.

Figure 1:
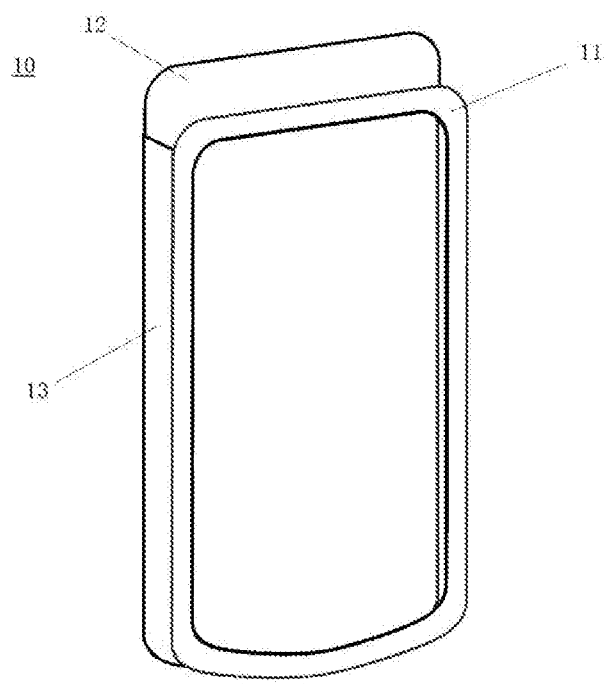
FIG. 1 schematically shows a perspective view of a mobile device containing bag according to an embodiment of the present invention.

In the drawings, the same components are indicated by the same reference signs. The accompanying drawings are not drawn to an actual scale.

DETAILED DESCRIPTION OF THE INVENTION

In the following, the present invention will be further described with reference to the accompanying drawings.

As shown in FIG. 1, a mobile device containing bag 10 according to an embodiment of the present invention includes a first baffle member 11, and a second baffle member 12 which is arranged opposite to and spaced from the first baffle member 11. The first baffle member 11 and the second baffle member 12 are configured to have a flat shape, i.e., each extending generally along a plane.

For the sake of convenience, in the context a side where the first baffle member 11 is arranged is referred to as "front side," while a side where the second baffle member 12 is arranged is referred to as "rear side."

The mobile device containing bag 10 further includes a connector, which is configured to connect opposite edges of the first baffle member 11 and the second baffle member 12, which are spaced from each other, together. Preferably, at least three edges of the first baffle member 11 are connected with opposite edges of the second baffle member 12, respectively, through the connector. In this manner, a mobile device accommodation space is defined by the first baffle member 11, the second baffle member 12, and the connector. The mobile device accommodation space is shaped and sized in such a manner that it fits for the mobile device to be accommodated.

In the embodiment as shown in FIG. 1, the connector is configured as an elastic sheet 13 extending between the first baffle member 11 and the second baffle member 12 along a direction perpendicular to the direction along which the first baffle member 11 and the second baffle member 12 extend. The elastic sheet 13 is arranged in such a manner that when it is in a relax state, the distance between the first baffle member 11 and the second baffle member 12 is smaller than the width of the mobile device to be placed in the mobile device accommodation space. Therefore, a mobile device cannot be placed in the mobile device accommodation space unless the elastic sheet 13 is elastically expanded so that the distance between the first baffle member 11 and the second baffle member 12 is equal to or larger than the width of the mobile device to be placed in the mobile device accommodation space. In this case, the elastic sheet 13 is in its elastic tension state, so that the first baffle member 11 and the second baffle member 12 will have a trend of moving toward each other. Under such circumstance, the first baffle member 11 and the second baffle member 12 can hold tight the mobile device placed therebetween. Therefore, the vibration and shake of the mobile device in the mobile device containing bag 10 can be effectively prevented.

Preferably, in the embodiment of FIG. 1, an elastic sheet 13 is arranged at each of a right side, a left side and a lower side of the first baffle member 11 and the second baffle member 12. The elastic sheet 13 can be made from at least one of spandex cloth, rubber film, silicon film, or the like.

Figure 2:
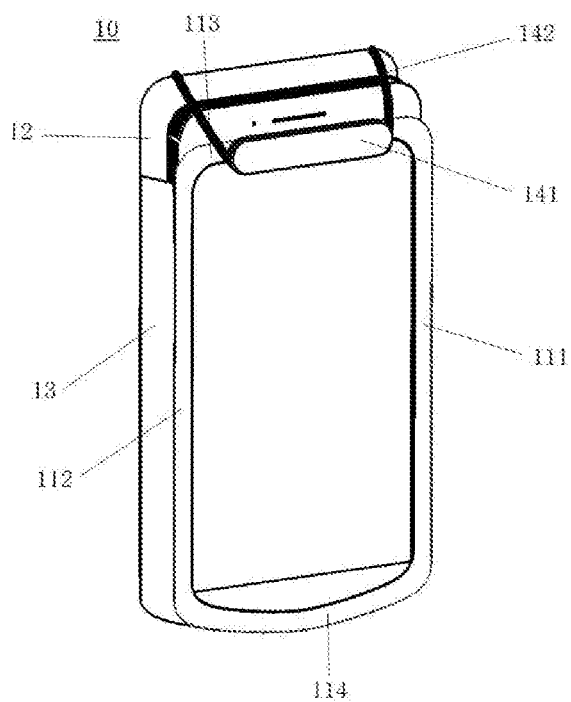
FIG. 2 schematically shows a perspective view of a mobile device containing bag according to another embodiment of the present invention.

In another embodiment as shown in FIG. 2, the connector comprises a protrusion 141 arranged on the first baffle member 11. The protrusion 141 extends forwardly from a front surface of the first baffle member 11, i.e., a surface far away from the second baffle member 12. In addition, the connector further comprises a catch 142 that can be rotatably connected with the second baffle member 12, which means the catch 142 can be rotatable with respect to the second baffle member 12. The catch 142 is configured to be able to move over the protrusion 141, so as to engage with an inner side face of the protrusion 141, i.e., the side face toward the bottom portion of the first baffle member 11 as shown in FIG. 2.

For example, in the embodiment as shown in FIG. 2, the catch 142 is configured as a flexible elongated element, such as a flexible fiber, a flexible rope, or the like. Both ends of the flexible elongated element are connected with the second baffle member 12, and the middle portion thereof is able to move over the protrusion 141 to engage with the inner side face of the protrusion 141. It should be understood that when the catch 142 per se is flexible, it can be fixedly connected with the second baffle member 12 directly, or rotatably connected therewith.

Preferably, the flexible elongated element is sufficiently elastic, so that it can be engaged with the protrusion 141 by a user. In addition, this arrangement can also facilitate to hold the mobile device by the first baffle member 11 and the second baffle member 12 in between. For example, the catch 142 can be formed by a rope or a loop of resilient material, such as rubber, silicone, or TPU.

In the embodiment as shown in FIG. 2, each of the first baffle member 11 and the second baffle member 12 of the mobile device containing bag 10 is configured as having a rectangular shape, wherein three edges, i.e., the right edge, the left edge and the lower edge, of the first baffle member 11 are connected with opposite edges of the second baffle member 12 respectively through individual elastic sheets 13, and the remaining edge of the first baffle member 11 is connected with its opposite edge of the second baffle member 12 through the above-mentioned protrusion 141 and catch 142. The protrusion 141 and the catch 142 can conveniently engage with and disengage from each other. Therefore, a user can easily place the mobile device into the mobile device accommodation space, in particular with a single hand, and enable engagement of the protrusion 141 and the catch 142 to reliably hold the mobile device in the mobile device accommodation space, or, enable disengagement of the catch 142 from the protrusion 141 to remove the mobile device from the mobile device containing bag.

In the embodiments as shown in FIGS. 1 and 2, the first baffle member 11 is configured as a frame with a hollow-out portion in a central area thereof. When the mobile device is placed into the mobile device accommodation space, the first baffle member 11 as frame can effective hold the mobile device in the mobile device accommodation space, and at the same time enable the display portion and/or operation portion of the mobile device exposed. For example, when the mobile device is a mobile phone, the hollow-out portion of the frame can be located in a position corresponding to the display of the mobile phone, so that the display of the mobile phone can be viewed from outside. This arrangement can facilitate the user to observe and operate the mobile phone directly when the mobile phone is carried. In this manner, invalid operation or misoperation can be avoided.

The hollow-out portion can be arranged according to the shape and size of the display portion and/or operation portion of the mobile device. For example, the hollow-out portion can be configured in such a manner that more than 80% of the display of a normal mobile phone can be viewed from outside.

Preferably, when the first baffle member 11 is configured as a generally rectangular frame, the frame may include two first side strips 111, 112, which are opposite to each other but both extend along a first direction, i.e., the vertical direction as shown in FIG. 2. In addition, the frame may further include a second side strip, which extends along a second direction perpendicular to the first direction and connects the first side strip 111 with the first side strip 112. There may provide only one second side strip, such as the second side strip 114 as shown in FIG. 2, which connects the first side strip 111 with the first side strip 112 at lower ends thereof. Alternatively, two second side strips that are spaced from and parallel to each other can be provided, such as second side strips 113, 114 as shown in FIG. 2, which connect the first side strip 111 with the first side strip 112 at upper ends and lower ends thereof, respectively.

The first baffle member 11 can be made from at least one of grass fiber sheet, plastic sheet, metal sheet, wood sheet, and so on. In this case, it is difficult for the first baffle member 11 and the mobile device to stick together, so that it can be more convenient for removing the mobile device from the mobile device accommodation space.

Figure 3:
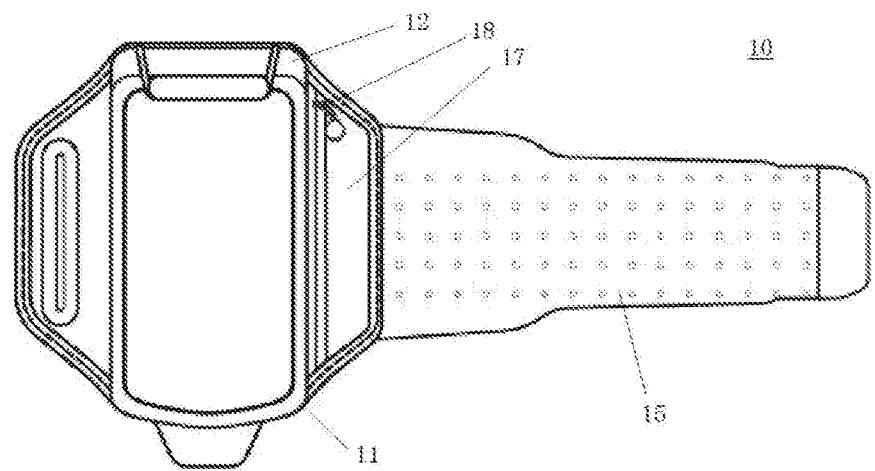
FIG. 3 schematically shows a front view of a mobile device containing bag according to a further embodiment of the present invention.

FIGS. 3 and 4 each show an embodiment in which the mobile device containing bag is an arm bag. Of course, the mobile device containing bag can be also a waist bag, a backpack, a hand bag, or the like.

As shown in FIGS. 3 and 4, the mobile device containing bag 10 includes a band 15, which is connected with the second baffle member 12. In the embodiment as shown in FIG. 3, the band 15 is connected with the second baffle member 12 at a side edge of the second baffle member 12. By contrast, in the embodiment as shown in FIG. 4, the band 15 extends through a rear side of the second baffle member 12, and then is connected with the second baffle member 12. The band 15 extends outwardly beyond the second baffle member 12.

The mobile device containing bag 10 may further include a first auxiliary containing sheet 16 arranged at the rear side the second baffle member 12. In the embodiment as shown in FIG. 4, the first auxiliary containing sheet 16 can be a part of the band 15. The first auxiliary containing sheet 16 is connected with the second baffle member 12 at an edge thereof, thus forming a first accommodation space therebetween. For example, the first accommodation space can be used for accommodating sheet-like articles, such as a card. In this case, the first auxiliary containing sheet 16 extends in parallel with the second baffle member 12, and both of them are non-elastic or substantially non-elastic. Therefore, the first accommodation space is shaped as a slit or a narrow gap.

Moreover, the mobile device containing bag 10 may further include a second auxiliary containing sheet 17, which is arranged at a front side of the band 15 and connected therewith at an edge thereof. A second accommodation space is formed between the second auxiliary containing sheet 17 and the band 15. Preferably, as shown in FIG. 4, the second auxiliary containing sheet 17 can be located over a portion of the band 15 that extends outwardly beyond the second baffle member 12 and is adjacent to the second baffle member 12. The second accommodation space can be, for example, used for accommodating small articles having irregular shapes, such as a key. In this case, preferably the second auxiliary containing sheet 17 has excellent elasticity, so that the volume of the second accommodation space is variable. In addition, after small articles are put in the second accommodation space, the elastic second auxiliary containing sheet 17 can exert a certain fixation on the small articles, thus preventing them from vibrating and shaking in the second accommodation space.

FIG. 4 shows an embodiment in which not only the first accommodation space but also the second accommodation space is provided. In the embodiment, the first accommodation space and the second accommodation space can share a common opening, which can be selectively closed by a closure element 18. The closure element 18 can be a zipper, for example. In this case, the second baffle member 12 and the second auxiliary containing sheet 17 are both provided with teeth of the zipper at opposite sides thereof, respectively.

The second baffle member 12 of the mobile device containing bag 10 can be made of material having supporting function, such as at least one of PC, EVA, plastic, or the like.

Although the present invention has been described with reference to preferred embodiments, various modifications and variants to the present invention may be made by anyone skilled in the art, without departing from the scope and spirit of the present invention. In particular, as long as there is no structural conflict, the respective technical features mentioned in various embodiments may be combined with one another in any manner. The present invention is not limited to the specific embodiments disclosed herein, but rather includes all the technical solutions falling within the scope of the claims.

The invention claimed is:

1. A mobile device containing bag, comprising:
   a flat first baffle member;
   a flat second baffle member, which is arranged opposite to and spaced from the first baffle member, the second baffle member extending in parallel with the first baffle member; and
   a connector, which is configured to connect opposite edges of the first baffle member and the second baffle member together, so that a mobile device accommodation space is defined by the first baffle member, the second baffle member, and the connector;
   wherein:
   the mobile device containing bag further includes a band, which is arranged at a side of the second baffle member far away from the first baffle member, the band being connected with the second baffle member at an edge thereof, thus forming a first accommodation space between the band and the second baffle member, a portion of the band extending beyond the second baffle member along an outward direction;
   a second auxiliary containing sheet is arranged in a region of said portion of the band adjacent to the second baffle member and at a side of the band toward the first baffle member, the second auxiliary containing sheet being connected with the band at an edge thereof, thus forming a second accommodation space between the second auxiliary containing sheet and the band; and
   the first accommodation space shares a common opening with the second accommodation space.

2. The mobile device containing bag according to claim 1, wherein the first baffle member is configured as a frame, with a hollow-out portion in a central area thereof.

3. The mobile device containing bag according to claim 2, wherein the frame includes two first side strips, which are opposite to each other but both extend along a first direction, and a second side strip, which extends along a second direction perpendicular to the first direction and connects said two first side strips with each other at opposite ends thereof.

4. The mobile device containing bag according to claim 1, wherein the connector includes an elastic sheet extending between opposite edges of the first baffle member and the second baffle member, the first baffle member being connected with the second baffle member through the elastic sheet.

5. The mobile device containing bag according to claim 1, wherein the connector includes:
   a protrusion, which extends from a front surface of the first baffle member along a direction far away from the second baffle member; and
   a catch, which is connected with the second baffle member, and configured to be movable over the protrusion to engage with an inner side face of the protrusion.

6. The mobile device containing bag according to claim 5, wherein the catch is a flexible elongated element, both ends of which are connected with the second baffle member, and a middle portion of which is configured to be moveable over the protrusion to engage with the inner side face of the protrusion.

7. The mobile device containing bag according to claim 6, wherein the flexible elongated element is made of elastic material.

* * * * *